(12) United States Patent
Shin et al.

(10) Patent No.: US 12,552,397 B2
(45) Date of Patent: Feb. 17, 2026

(54) VEHICLE CONTROL APPARATUS AND METHOD FOR PERFORMING TORQUE CONTROL OF VEHICLE

(71) Applicant: Hyundai Kefico Corporation, Gyeonggi-Do (KR)

(72) Inventors: Hyun Ki Shin, Gyeonggi-do (KR); Eun Sang Park, Gyonggi-do (KR); Byung Gun Kim, Seoul (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 270 days.

(21) Appl. No.: 18/364,948

(22) Filed: Aug. 3, 2023

(65) Prior Publication Data

US 2024/0043021 A1 Feb. 8, 2024

(30) Foreign Application Priority Data

Aug. 5, 2022 (KR) .......................... 10-2022-0097914

(51) Int. Cl.
*B60W 50/02* (2012.01)
*B60W 30/09* (2012.01)
(Continued)

(52) U.S. Cl.
CPC ........ *B60W 50/0205* (2013.01); *B60W 30/09* (2013.01); *B60W 30/0953* (2013.01);
(Continued)

(58) Field of Classification Search
CPC ............ B60W 50/0205; B60W 30/09; B60W 30/0953; B60W 30/0956; B60W 50/038;
(Continued)

(56) References Cited

U.S. PATENT DOCUMENTS

2015/0274027 A1* 10/2015 Crombez ................ B60L 58/12
903/903
2018/0208175 A1* 7/2018 Zhang .................... B60W 10/06
(Continued)

FOREIGN PATENT DOCUMENTS

CN 113246977 A 8/2021
DE 102018101478 A1 7/2018
(Continued)

OTHER PUBLICATIONS

Office Action from German Patent and Trade Mark Office for German Patent Application No. 102023120617.6 issued on Mar. 27, 2025, English translation, 9 pages.

*Primary Examiner* — Daniel M. Robert
(74) *Attorney, Agent, or Firm* — Fox Rothschild LLP

(57) ABSTRACT

A vehicle control apparatus includes: a vehicle state judgment unit that judges a transverse driving control state and a longitudinal driving control state of a vehicle when detecting that a torque of a vehicle power source is abnormal, and judges a normal power source when the transverse driving control is in a normal state and the longitudinal driving control is in a failure state; a driving condition judgment unit that judges a driving state corresponding to a predetermined accident risk driving condition by using vehicle information when there is the normal power source; and a vehicle control unit that controls driving of the vehicle by using a target safety torque provided in advance when the driving state of the vehicle corresponds to the accident risk driving condition, where the vehicle is operated using the target safety torque when the driving state is the accident risk driving condition.

20 Claims, 4 Drawing Sheets

(51) Int. Cl.
*B60W 30/095* (2012.01)
*B60W 50/038* (2012.01)

(52) U.S. Cl.
CPC ...... *B60W 30/0956* (2013.01); *B60W 50/038* (2013.01); *B60W 2552/15* (2020.02); *B60W 2555/60* (2020.02)

(58) Field of Classification Search
CPC ......... B60W 2552/15; B60W 2555/60; B60W 10/06; B60W 10/08; B60W 20/50; B60W 50/029; B60W 2050/0297; B60W 2510/0657; B60W 2510/083; B60W 2540/10; B60W 2050/021; B60W 2050/022; B60W 2540/12; B60W 2554/802; B60W 2554/804; B60W 30/18009; B60W 40/10; B60W 50/0098; B60W 50/02; B60W 50/035; B60W 30/08; B60W 30/188; B60W 40/076; Y02T 10/72; B60Y 2306/15
See application file for complete search history.

(56) References Cited

U.S. PATENT DOCUMENTS

2020/0298888 A1\* 9/2020 Ozeki ................. H01M 10/443
2024/0043021 A1\* 2/2024 Shin .................... B60W 50/038

FOREIGN PATENT DOCUMENTS

| JP | 4337861 B2 \* | 9/2009 |
| KR | 10-2010-0064604 A | 6/2010 |
| KR | 10-1063225 B1 | 9/2011 |
| KR | 101550543 B1 | 9/2015 |
| KR | 10-1567922 | 11/2015 |
| KR | 101776768 B1 | 9/2017 |

\* cited by examiner

VEHICLE CONTROL APPARATUS AND METHOD FOR PERFORMING TORQUE CONTROL OF VEHICLE

CROSS-REFERENCE TO RELATED APPLICATIONS

This application claims under 35 U.S.C. § 119(a) the benefit of Korean Patent Application No. 10-2022-0097914, filed in the Korean Intellectual Property Office on Aug. 5, 2022, the entire contents of which are incorporated herein by reference.

BACKGROUND

(a) Technical Field

The present disclosure relates to a vehicle control apparatus and a vehicle control method for performing torque control of a vehicle, more particularly, to the vehicle control apparatus and method configured to judge a driving state of the vehicle and control the vehicle based on a target safety torque.

(b) Description of the Related Art

A hybrid electric vehicle (HEY), also referred to as a hybrid vehicle, includes an electric motor in addition to a conventional configuration of a transmission and an internal combustion engine in order to achieve high fuel efficiency, and additionally includes components such as a battery, and is configured to use mechanical and electrical energy generated from the internal combustion engine and the electric motor as driving energy sources of the vehicle.

Therefore, the hybrid vehicle is driven by appropriately using electric power from the electric motor or mechanical power of the internal combustion engine according to a driver's intention and a battery power state, and fuel efficiency of the vehicle may be maximized by operating the vehicle on electric power to the maximum extent possible.

Regarding a criterion for determining the driver's intention regarding the required torque, in the case of a conventional electronic throttle control (ETC) type general gasoline vehicle, the intention of the driver is determined by an accelerator pedal position arid a brake switch input signal.

An engine control unit (ECU) controls the required torque of the driver to be implemented by controlling a throttle opening level and a fuel injection amount by reflecting a position of an accelerator pedal and a brake switch input signal to which the required torque and the intention of the driver are reflected.

When the driver continuously requests the torque to the vehicle through the accelerator pedal, the required torque should be precisely generated by the vehicle and safe driving should be guaranteed through the generated torque.

Therefore, technology capable of detecting a failure while continuously monitoring the torque of the vehicle is required.

In the related art, there is a method for controlling the vehicle in a driving mode to limit the torque of the vehicle below a specific value when the failure occurs in the vehicle according to a torque monitoring result of the vehicle.

When the failure is suspected in a vehicle power source, it is a good strategy that the vehicle moves to a safe zone and gets maintenance with a limited torque, but the case may still be a dangerous control in a specific situation. For example, when a vehicle torque limit is performed by torque monitoring in a situation in which other vehicles approach closely or a situation in which the vehicle climbs a high ramp, an accident may occur due to rapid driving force reduction not intended by the driver.

Accordingly, a method is required, which may control the vehicle until the vehicle sufficiently enters a safe situation by considering a power train type or a driving condition when detecting abnormalities during the torque monitoring.

SUMMARY

Therefore, the present disclosure provides a vehicle control apparatus and a vehicle control method configured to determine a state of a controller related to driving of a vehicle and judge an accident risk level, judge a driving condition when a normal power source is usable, calculate a target safety torque according to the driving condition (e.g., a dangerous situation or an inclined road) and perform torque control within an allowance output, when detecting a torque failure of a vehicle power source according to torque monitoring.

An exemplary embodiment of the present disclosure provides a vehicle control apparatus which includes: a vehicle state judgment unit judging a transverse driving control state and a longitudinal driving control state of a vehicle when detecting that a torque of a vehicle power source is abnormal, and judging a normal power source among a plurality of power sources of the vehicle when the transverse driving control is in a normal state and the longitudinal driving control is in a failure state; a driving condition judgment unit judging a driving state of the vehicle corresponds to a predetermined accident risk driving condition by using vehicle information when there is the normal power source; and a vehicle control unit controlling vehicle driving by using a target safety torque provided in advance when the driving state of the vehicle corresponds to the accident risk driving condition, where the vehicle is operated using the target safety torque when the driving state is the accident risk driving condition.

The vehicle state judgment unit may judge whether the torque is normal by using a user's required torque and a torque of the vehicle power source, and receive a current state signal from each of a controller related to the longitudinal driving control and a controller related to the transverse driving control when detecting that the torque of the vehicle power source is abnormal.

The vehicle state judgment unit may judge whether the controller related to the transverse driving control has a failure and whether the controller related to the longitudinal driving control has the failure based on the current state signal.

The vehicle state judgment unit may divide and set an accident risk stage of the vehicle into three stages according to the transverse driving control state and the longitudinal driving control state.

The vehicle state judgment unit may judge whether there is a normal power source among the plurality of power sources based on a normal torque range including a lower threshold for torque error and an upper threshold for torque error provided in advance when the transverse driving control is in a normal state and the longitudinal driving control is in a failure state according to the accident risk stage of vehicle.

The vehicle state judgment unit may calculate a power train allowance output of the vehicle by using the normal power source when there is the normal power source.

The vehicle state judgment unit may judge that vehicle control is required through a predetermined minimum torque when there is no normal power source.

When the vehicle is positioned on the slope, another vehicle approaches from the rear, or the driving vehicle is positioned in a low speed limit zone, the driving condition judgment unit may judge that the driving state of the vehicle corresponds to the accident risk driving condition.

The vehicle control unit may operate in a safety margin torque control mode provided in advance to control vehicle driving with a predetermined minimum torque when transverse driving control is impossible, there is no normal power source, or the driving state of the vehicle does not correspond to the accident risk driving condition.

The vehicle control unit may calculate the target safety torque through two or more equations provided for each driving situation of the vehicle, and control the vehicle driving by using the target safety torque when the driving state of the vehicle corresponds to the accident risk driving condition.

A vehicle may include the vehicle control unit.

Another exemplary embodiment of the present disclosure provides a vehicle control method which includes: a state judging step of judging, by a vehicle state judgment unit, a transverse driving control state and a longitudinal driving control state of a vehicle when detecting that a torque of a vehicle power source is abnormal; a normal power source judging step of judging, by the vehicle state judgment unit, a normal power source among a plurality of power sources of the vehicle when the transverse driving control is a normal state and the longitudinal driving control is in a failure state; a driving condition judging step of judging, by a driving condition judgment unit, whether a driving state of the vehicle corresponds to a predetermined accident risk driving condition by using vehicle information when there is the normal power source; and a safety torque control step of controlling, by a vehicle control unit, vehicle driving by using a target safety torque provided in advance when the driving state of the vehicle corresponds to the accident risk driving condition, where the vehicle is operated using the target safety torque when the driving state is the accident risk driving condition.

The vehicle control method may further include a detecting step of judging, by the vehicle state judgment unit, whether a torque is normal by using a user's required torque and a torque of the vehicle power source before the state judging step; and a state confirming step of receiving, by the vehicle state judgment unit, a current state signal from each of a controller related to longitudinal driving control of the vehicle and a controller related to transverse driving control of the vehicle when detecting that the torque of the vehicle is abnormal after the detecting step.

The state judging step may include a first state judging step of judging whether the controller related to the transverse driving control has a failure based on the current state signal, and a second state judging step of judging whether the controller related to the longitudinal driving control has the failure based on the current state signal.

The state judging step may further include dividing and setting an accident risk stage of the vehicle into three stages according to the transverse driving control state and the longitudinal driving control state.

The vehicle control method may further include after the state judging step, a power source confirming step of judging, by the vehicle state judgment unit, whether there is the normal power source among the plurality of power sources based on a normal torque range including a lower threshold for torque error and an upper threshold for torque error provided in advance when the transverse driving control is in a normal state and the longitudinal driving control is in a failure state according to the accident risk stage of vehicle.

The vehicle control method may further include a calculating step of calculating, by the vehicle state judgment unit, a power train allowance output of the vehicle by using the normal power source when there is the normal power source, after the normal power source judging step.

The vehicle control method may further include after the normal power source judging step, judging, by the vehicle state judgment unit, that vehicle control is required through a predetermined minimum torque when there is no normal power source.

The vehicle control method may further include the accident risk judging step the driving condition judgment unit judging, when the vehicle is positioned on the slope, another vehicle approaches from the rear, or the driving vehicle is positioned in a low speed limit zone, that the accident risk driving condition is satisfied, after the driving condition judging step.

The vehicle control method may further include a safety margin torque control step of controlling, by the vehicle control unit, vehicle driving with a predetermined minimum torque when transverse driving control is impossible, there is no normal power source, or the driving state of the vehicle does not correspond to the accident risk driving condition.

The safety torque control step may include calculating, by the vehicle control unit, the target safety torque through two or more equations provided for each driving situation of the vehicle, and controls the vehicle driving by using the target safety torque when the driving state of the vehicle corresponds to the accident risk driving condition.

According to an exemplary embodiment of the present disclosure, by a vehicle control apparatus, there is an effect in that a state of a controller related to driving of a vehicle is determined to judge a driving risk level, a driving condition is judged when a normal power source is usable, a target safety torque is calculated according to the driving condition (e.g., a dangerous situation or an inclined road) and torque control is performed within an allowance output to prevent an accident risk of a vehicle, which may occur due to an external condition, when detecting a torque failure according to torque monitoring.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
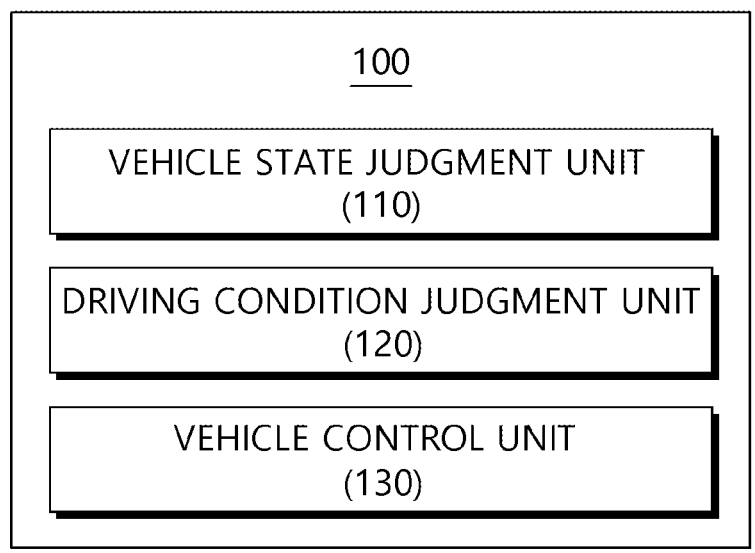
FIG. 1 is a block diagram of a vehicle control apparatus according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er". "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a preferred embodiment of the present disclosure will be described in detail with reference to the accompanying drawings. First, when reference numerals refer to components of each drawing, it is to be noted that although the same components are illustrated in different drawings, the same components are denoted by the same reference numerals as possible. Further, hereinafter, the preferred embodiment of the present disclosure will be described, but the technical spirit of the present disclosure is not limited thereto or restricted thereby and the embodiments can be modified and variously executed by those skilled in the art.

FIG. 1 is a block diagram of a vehicle control apparatus according to an exemplary embodiment of the present disclosure.

Referring to FIG. 1, according to an exemplary embodiment of the present disclosure, the vehicle control apparatus 100 determines a state of a controller related to driving of a vehicle to judge a driving risk level, judges a driving condition when a normal power source is usable, calculates a target safety torque according to the driving condition (e.g., a dangerous situation or an inclined road) and performs torque control within an allowance output to prevent an accident risk of a vehicle, which may occur due to an external condition, when detecting a torque failure of a power source according to torque monitoring.

The vehicle control apparatus 100 according to an exemplary embodiment of the present disclosure may include a vehicle state judgment unit 110, a driving condition judgment unit 120, and a vehicle control unit 130.

The vehicle state judgment unit 110 may judge whether a motor of the vehicle, a controller related to vehicle driving, and an actuator are in a normal state. In particular, in the case of a hybrid vehicle or an electric vehicle in which a front wheel and a rear wheel have independent power sources, the vehicle state judgment unit 110 may independently judge whether each power source is abnormal based on a torque signal of the vehicle.

The vehicle state judgment unit 110 may receive a position of an accelerator pedal of a user and a brake switch input signal from various sensors of the vehicle, and judge a required torque of the user based thereon. Various sensors may include an accelerator pedal sensor (APS), a brake pedal sensor (BPS), and a steering wheel angle sensor.

The vehicle state judgment unit 110 may receive a motor torque and an engine torque actually measured by a controller that drives the motor or an engine according to the required torque. The vehicle state judgment unit 110 compares the required torque of the user and the motor torque or compares the required torque of the user or the engine torque to judge whether the torque is normal.

The vehicle state judgment unit 110 may judge a torque failure state when a result according to a comparison result rapidly increases or decreases to a reference diagnosis torque or more. In this case, the vehicle state judgment unit 110 may judge that longitudinal driving control of the vehicle is impossible.

The vehicle state judgment unit 110 may receive a current state signal from the controller and the actuator related to the longitudinal driving of the vehicle. The vehicle state judgment unit 110 may judge whether the controller and the actuator have a failure based on the current state signal. The controller related to the longitudinal driving control may include a Vehicle Control Unit (VCU), an Engine Management System (EMS), Micro Controller Unit (MCU), and a Battery Management System (BMS). The actuator may include a throttle and a brake.

The vehicle state judgment unit 110 may receive the current state signal from the controller and the actuator related to the longitudinal driving of the vehicle. The vehicle state judgment unit 110 may judge whether the controller and the actuator have the failure based on the received current state signal. The controller related to the longitudinal driving control may include the vehicle control unit (VCU).

The vehicle state judgment unit 110 may divide and set an accident risk stage into 3 stages according to failure states of controllers and actuators related to the longitudinal driving control and transverse driving control. In an exemplary embodiment, a first stage may represent a simultaneous longitudinal and transverse control inability state. A second stage may represent a longitudinal normal state and a transverse control inability state. A third stage may represent a longitudinal control inability state and a transverse normal state.

In the case of the first stage, there is a high risk of continuous operation of the vehicle, so a vehicle stop is required.

In the second stage, since a situation may occur, which is difficult to handle, such as a collision between an obstacle and the vehicle or the vehicle falling over a bridge, a vehicle torque value is required to be limited to a minimum safety margin torque.

In the third stage, an abnormal state of a current vehicle power source is more specifically judged, and when a normal power remains, the vehicle is required to be controlled with a safety margin torque considering a driving condition for avoiding a risk which may occur in a current driving state.

When the vehicle state judgment unit 110 judges that the controller or the actuator related to the transverse driving control is in the normal state and an abnormal torque is generated from the power source (engine or motor), the vehicle state judgment unit 110 may judge whether individual power sources are within a normal torque range according to the third stage. The vehicle state judgment unit 110 may judge whether torques of the individual power sources are abnormal based on the normal torque range including a lower threshold for torque error and an upper threshold for torque error provided in advance through a vehicle test.

When a single power source (e.g., engine) is normal and the other power source (e.g., motor) is in a failure state, it is possible to get out of the dangerous situation through the normal-state power source.

The vehicle state judgment unit 110 may enter an output calculation mode of calculating a power train allowance output using a normal power source when there is the normal-state power source. When a plurality of power sources is used, it is general to distribute and use the torque to multiple power sources according to the driving condition. However, the vehicle state judgment unit 110 may calculate the maximum torque allowable for the normal-state power source without separate distribution when some power sources are not available.

When there is no normal-state power source, the vehicle state judgment unit 110 judges that an accident risk which may occur due to an abnormal vehicular power system higher to request the vehicle control unit 130 to immediately operate in a safety margin torque control mode. The safety margin torque control mode refers a mode of controlling the vehicle through a minimum torque for evacuation of the vehicle from a dangerous area.

When the driving condition judgment unit 120 judges that the power source is abnormal as the vehicle torque rapidly decreases, the driving condition judgment unit 120 may judge various accident risk driving conditions of the vehicle in preparation for the accident risk situation due to the abnormal power source. The accident risk driving condition may include a collision with a rear vehicle due to a rapid velocity reduction, a situation in which the vehicle is unintentionally pushed backwards on an inclined road due to the lack of the torque, a situation in which a velocity is not maintained at a place with a low speed limit, such as a highway, etc.

Various vehicle information including the power train allowance output, an inter-vehicle distance, an approaching vehicle velocity, a road slope, and a road speed limit may be used for judging the accident risk driving condition. Here, the power train refers to a transmission device between a vehicle engine and a driving wheel.

The driving condition judgment unit 120 may confirm whether there is an approach rear vehicle, the inter-vehicle distance, and a velocity of the approach vehicle through a radar sensor (not illustrated). The driving condition judgment unit 120 may confirm a slope and a road speed limit of a driving road based on a vehicle position received by a GPS (not illustrated).

The driving condition judgment unit 120 may judge whether the driving state of the vehicle corresponds to the accident risk driving condition such as whether the vehicle is positioned on the slope or another vehicle approaches from the rear through various sensing information.

In an exemplary embodiment, the accident risk driving condition may be quantified as an accident risk score depending on the need of the user. The driving condition judgment unit 120 may judge whether the accident risk score depending on the accident risk situation exceeds a predetermined reference score.

The driving condition judgment unit 120 may judge that the driving state of the vehicle corresponds to the accident risk driving condition when the accident risk score exceeds the reference score. The driving condition judgment unit 120 may transmit, to the vehicle control unit 130, contents in which the driving state of the vehicle corresponds to the accident risk driving condition.

The vehicle control unit 130 may perform safety torque control, safety margin torque control, or stop control depending on whether the driving state of the vehicle corresponds to the accident risk driving condition.

The vehicle control unit 130 may calculate a torque used for maintaining the vehicle velocity in the safety torque control mode when the driving state of the vehicle corresponds to the accident risk driving condition. Here, the torque may be defined as the target safety torque.

In an exemplary embodiment, the vehicle control unit 130 may calculate the target safety torque in order to maintain the vehicle velocity in a rear collision risk situation or a low speed limit zone. The target safety torque may be expressed as in Equation 1 below.

$$T_{safe,\ target} = (V_{target} - V_{veh}) \cdot m_{veh} \cdot R_{whl} \cdot K_1 + \Delta(V_{target} - V_{veh}) \cdot m_{veh} \cdot R_{whl} \cdot K_2 \qquad \text{<Equation 1>}$$

In Equation 1, $T_{safe,\ target}$ represents the target safety torque, $V_{target}$ represents a target velocity, $V_{veh}$ represents a current vehicle velocity, $m_{veh}$ represents a vehicle mass, $R_{whl}$ represents a wheel radius, and $K_1$ and $K_2$ represent correction factors.

In an exemplary embodiment, the vehicle control unit 130 may calculate the target safety torque as in Equation 2 below on the road with the slope.

$$T_{safe,\ target} = m_{veh} \cdot \cos\theta \cdot R_{whl} \cdot K_3 \qquad \text{<Equation 2>}$$

In Equation 2, $T_{safe,\ target}$ represents the target safety torque, $m_{veh}$ represents the vehicle mass, $\theta$ represents the road slope, $R_{whl}$ represents the wheel radius, and $K_3$ represents the correction factor.

The vehicle control unit 130 may calculate the target safety torque for each situation in parallel and use a highest target safety torque among the target safety torques in complex situations.

The vehicle control unit 130 may perform vehicle control with a minimum torque for evacuation from the dangerous area when operating in the safety margin torque control mode.

When the vehicle control unit 130 enters the first stage (transverse driving control is impossible and the longitudinal driving control is impossible) according to continuous monitoring for an accident risk stage, the vehicle control unit 130 judges that the risk of continuous driving is extremely high to immediately stop the vehicle.

Figure 2:
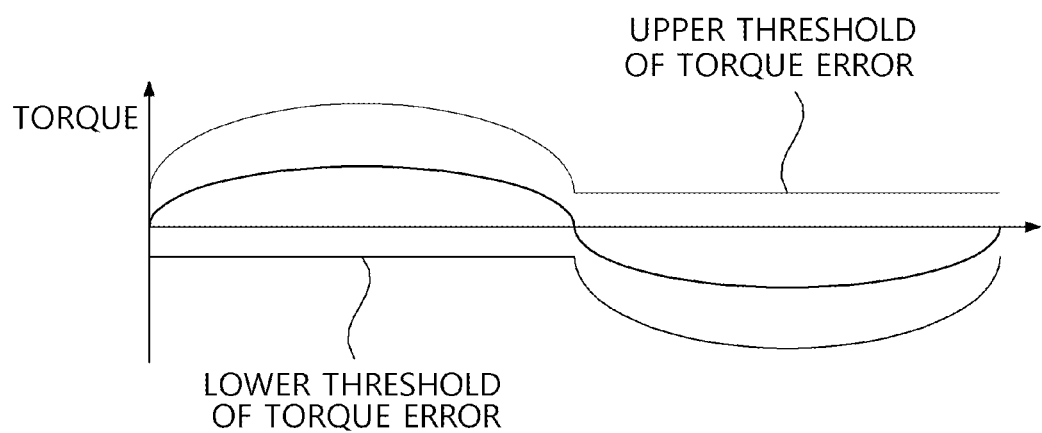
FIG. 2 is a diagram illustrating a torque range for discriminating a torque failure.

FIG. 2 is a diagram illustrating a torque range for discriminating a torque failure.

Referring to FIG. 2, a normal torque range of the vehicle power source provided through a test process may be confirmed. The normal torque range may include an upper threshold of torque error and a lower threshold of torque error. The vehicle state judgment unit 110 may judge whether the normal torque range is exceeded for each of individual power sources.

Figure 3:
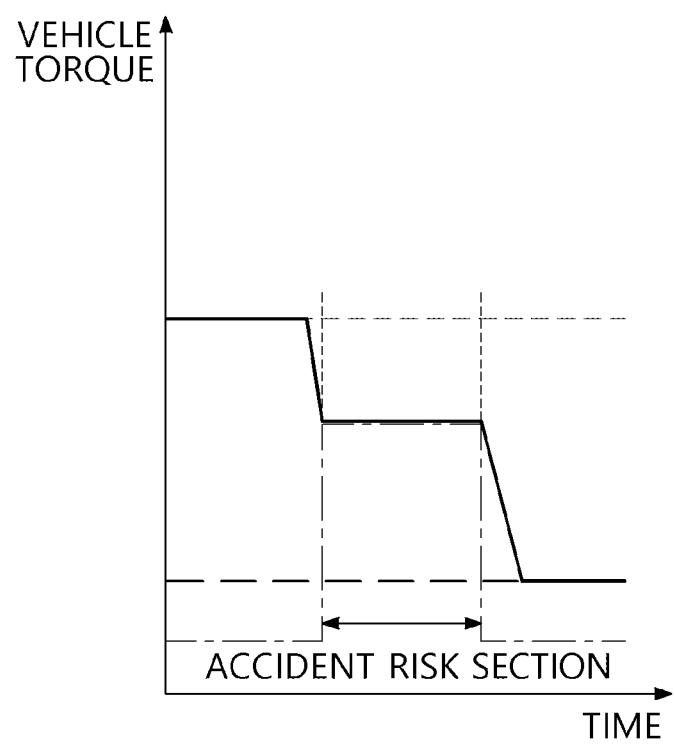
FIG. 3 is a diagram illustrating various torque values for vehicle safety control.

FIG. 3 is a diagram illustrating various torque values for vehicle safety control.

Referring to FIG. 3, a driver's required torque, a driving condition considering safety torque, a safety margin torque, and a vehicle torque output graph may be continued.

The vehicle control unit 130 may perform the vehicle control by using the driving condition considering safety torque (i.e., the target safety torque) in an accident risk section.

The vehicle control unit 130 may operate in the safety margin torque control mode and perform the vehicle control with the safety margin torque for evacuation from the dangerous area when there is no normal-state power source.

Figure 4:
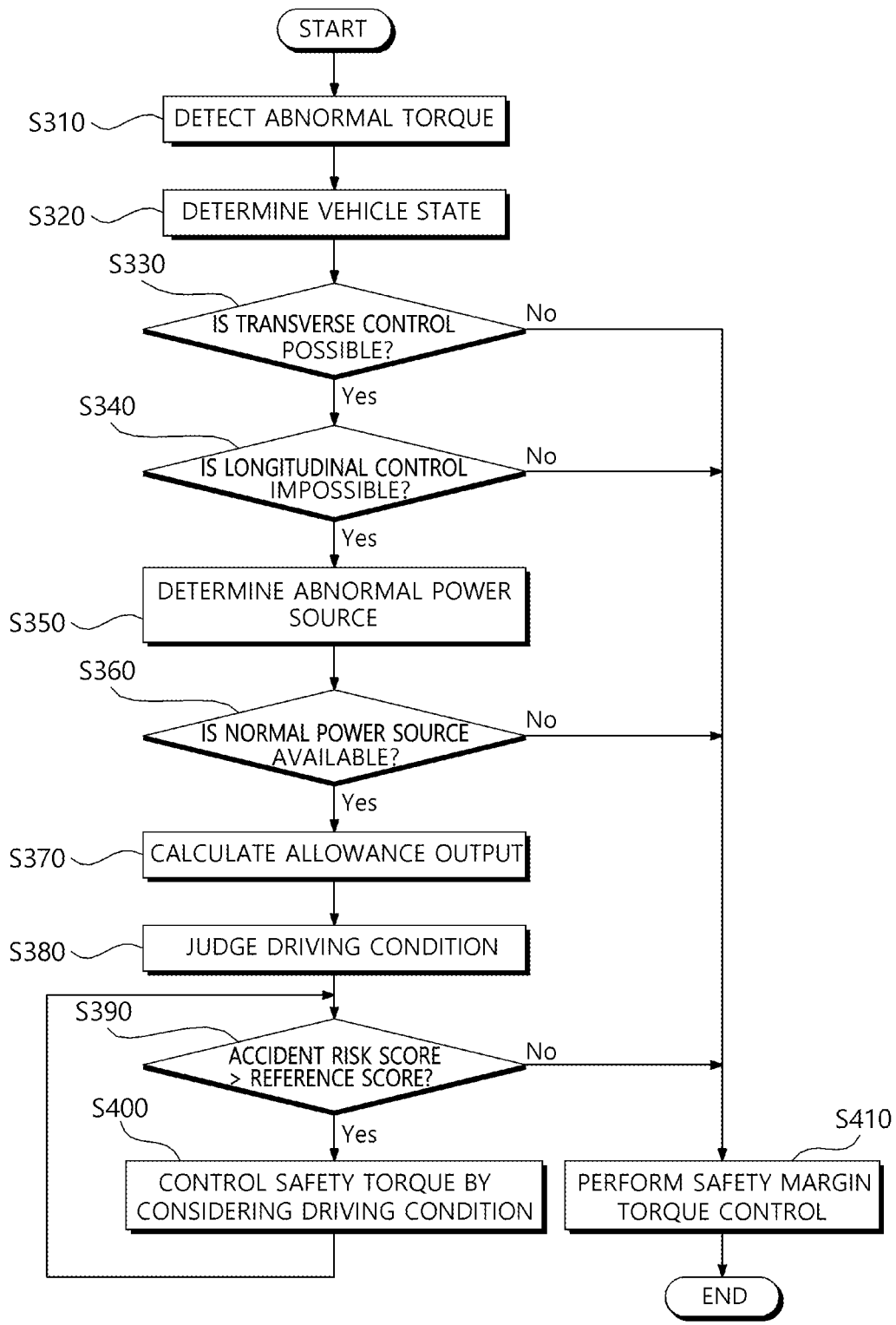
FIG. 4 is a flowchart of a vehicle control method according to an exemplary embodiment of the present disclosure.

FIG. 4 is a flowchart of a vehicle control method according to an exemplary embodiment of the present disclosure.

Referring to FIGS. 1 and 4, according to an exemplary embodiment of the present disclosure, the vehicle control method determines a state of a controller related to driving of a vehicle to judge a driving risk level, judges a driving condition when a normal power source is usable, calculates a target safety torque according to the driving condition (the risk situation and the road with the slope) and performs torque control within an allowance output to prevent an accident risk of a vehicle, which may occur due to an external condition, when detecting a torque failure of a power source of the vehicle.

The vehicle control method according to an exemplary embodiment of the present disclosure may include steps S310 to S410.

In a detecting step S310, the vehicle state judgment unit 110 may receive a motor torque and an engine torque actually measured by a controller that drives the motor or an engine according to the required torque of the user. The vehicle state judgment unit 110 compares the required torque of the user and the motor torque or compares the required torque of the user or the engine torque to judge whether the torque is normal. The vehicle state judgment unit 110 may judge a torque failure state when a result according to a comparison result rapidly increases or decreases to a reference diagnosis torque or more.

In a state confirming step S320, the vehicle state judgment unit 110 may receive a current state signal from the controller and the actuator related to the longitudinal driving of the vehicle. Further, the vehicle state judgment unit 110 may receive a current state signal from the controller and the actuator related to vehicle steering.

In a first state judging step S330, the vehicle state judgment unit 110 may judge whether the controller and the actuator related to transverse driving control have the failure based on the received current state signal.

In a second state judging step S340, the vehicle state judgment unit 110 may judge whether the controller and the actuator related to longitudinal driving control have the failure based on the received current state signal.

In a power source confirming step S350, the vehicle state judgment unit 110 may confirm whether the individual power source is in the normal torque range when it is judged that the controller or the actuator related to the transverse driving control is in a normal state and the controller or the actuator related to the longitudinal driving control is in the failure state.

In a normal power source judging step S360, the vehicle state judgment unit 110 may judge whether torques of the individual power sources are abnormal based on the normal torque range including a lower threshold for torque error and an upper threshold for torque error provided in advance through a vehicle test.

In a calculating step S370, the vehicle state judgment unit 110 may calculate the power train allowance output using a normal power source when there is the normal state power source. When there is no normal-state power source, the vehicle state judgment unit 110 judges that an accident risk which may occur due to an abnormal vehicular power system higher to request the vehicle control unit 130 to immediately operate in a safety margin torque control mode.

In a driving condition judging step S380, the driving condition judgment unit 120 may judge various accident risk driving conditions of the vehicle by using information of the vehicle.

In an accident risk judging step S390, when a driving vehicle is positioned on the slope, another vehicle approaches from the rear, or the driving vehicle is positioned in a low speed limit zone, the driving condition judgment unit 120 may judge that the driving state of the vehicle corresponds to the accident risk driving condition.

In an exemplary embodiment, the accident risk driving condition may be quantified as an accident risk score depending on the need of the user. The driving condition judgment unit 120 may judge whether the accident risk score depending on the accident risk situation exceeds a predetermined reference score. The driving condition judgment unit 120 may judge that the driving state of the vehicle corresponds to the accident risk driving condition when the accident risk score exceeds the reference score. The driving condition judgment unit 120 may transmit, to the vehicle control unit 130, related contents when the driving state of the vehicle corresponds to the accident risk driving condition.

In a safety torque control step S400, when the driving state of the vehicle corresponds to the accident risk driving condition, the vehicle control unit 130 operates in the safety torque control mode to calculate the target safety torque in order to maintain the vehicle velocity in a rear collision risk situation, the low speed limit zone, or the road with the slope. The vehicle control unit 130 may control the vehicle driving by using the target safety torque. In particular, the vehicle may be operated using the target safety torque when the driving state is the accident risk driving condition.

In a safety margin torque controlling step S410, the vehicle control unit 130 may operate in the safety margin torque control mode when transverse driving control is impossible, there is no normal power source, or the driving state of the vehicle does not correspond to the accident risk driving condition. The vehicle control unit 130 may perform vehicle control with a predetermined minimum torque for evacuation from the dangerous area when operating in the safety margin torque control mode. Here, the minimum torque may be defined as a safety margin torque. Meanwhile, when the vehicle control unit 130 enters the first stage (transverse driving control is impossible and the longitudinal driving control is impossible) according to continuous monitoring for an accident risk stage, the vehicle control unit 130 judges that the risk of continuous driving is extremely high to immediately stop the vehicle.

The above description just illustrates the technical spirit of the present disclosure and various changes, modifications, and substitutions can be made by those skilled in the art to which the present disclosure pertains without departing from an essential characteristic of the present disclosure. Therefore, the embodiments and the accompanying drawings disclosed in the present disclosure are used to not limit but describe the technical spirit of the present disclosure and the scope of the technical spirit of the present disclosure is not limited by the embodiments and the accompanying drawings.

The steps and/or operations according to the present disclosure may occur in different orders, in parallel, or concurrently in other exemplary embodiments for other epochs or the like, as may be understood by those skilled in the art.

Depending on the exemplary embodiment, at least some or all of the steps and/or operations may be implemented or performed by using commands, programs, and interactive data structures stored in one or more non-transitory computer-readable media, and one or more processors driving a client and/or a server. The one or more non-transitory computer-readable media may be, by way of example, software, firmware, hardware, and/or any combination thereof. Further, the functions of the "module" discussed in this specification may be implemented by software, firmware, hardware, and/or any combination thereof.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A vehicle control apparatus comprising:
    a vehicle state judgment unit configured to judge a transverse driving control state and a longitudinal driving control state of a vehicle only when detecting that a torque of a vehicle power source is abnormal, and judge a normal power source among a plurality of power sources of the vehicle only when the transverse driving control is in a normal state and the longitudinal driving control is in a failure state;
    a driving condition judgment unit configured to judge whether a driving state of the vehicle corresponds to a predetermined accident risk driving condition by using vehicle information only when the vehicle is operating using the normal power source; and
    a vehicle control unit configured to control driving of the vehicle by using a target safety torque provided in advance only when the driving state of the vehicle corresponds to the accident risk driving condition,
    wherein the vehicle is operated using the target safety torque only when the driving state is the accident risk driving condition.

2. The vehicle control apparatus of claim 1, wherein the vehicle state judgment unit is configured to judge whether the torque is normal by using a user's required torque and a torque of the vehicle power source, and receive a current state signal from each of a controller related to the longitudinal driving control and a controller related to the transverse driving control when detecting that the torque of the vehicle power source is abnormal.

3. The vehicle control apparatus of claim 2, wherein the vehicle state judgment unit is configured to judge whether the controller related to the transverse driving control has a failure and whether the controller related to the longitudinal driving control has the failure based on the current state signal.

4. The vehicle control apparatus of claim 3, wherein the vehicle state judgment unit is configured to divide and set an accident risk stage into three stages according to the transverse driving control state and the longitudinal driving control state.

5. The vehicle control apparatus of claim 4, wherein the vehicle state judgment unit is configured to judge whether there is a normal power source among the plurality of power sources based on a normal torque range including a lower threshold for torque error and an upper threshold for torque error provided in advance when the transverse driving control is in a normal state and the longitudinal driving control is in a failure state according to the accident risk stage of vehicle.

6. The vehicle control apparatus of claim 1, wherein the vehicle state judgment unit is configured to calculate a power train allowance output of the vehicle by using the normal power source when there is the normal power source.

7. The vehicle control apparatus of claim 1, wherein the vehicle state judgment unit is configured to judge that vehicle control is required through a predetermined minimum torque when there is no normal power source.

8. The vehicle control apparatus of claim 1, wherein when the vehicle is positioned on the slope, another vehicle approaches from a rear of the vehicle, or the vehicle is positioned in a low speed limit zone, the driving condition judgment unit judges that the driving state of the vehicle corresponds to the accident risk driving condition.

9. The vehicle control apparatus of claim 1, wherein the vehicle control unit operates in a safety margin torque control mode provided in advance to control vehicle driving with a predetermined minimum torque when transverse driving control is impossible, there is no normal power source, or the driving state of the vehicle does not correspond to the accident risk driving condition.

10. A vehicle comprising a vehicle control apparatus, the vehicle control apparatus comprising:
    a vehicle state judgment unit configured to judge a transverse driving control state and a longitudinal driving control state of the vehicle only when detecting that a torque of a vehicle power source is abnormal, and judge a normal power source among a plurality of power sources of the vehicle only when the transverse driving control is in a normal state and the longitudinal driving control is in a failure state;

a driving condition judgment unit configured to judge whether a driving state of the vehicle corresponds to a predetermined accident risk driving condition by using vehicle information only when the vehicle is operating using the normal power source; and a vehicle control unit configured to control driving of the vehicle by using a target safety torque provided in advance only when the driving state of the vehicle corresponds to the accident risk driving condition, wherein the vehicle is operated using the target safety torque only when the driving state is the accident risk driving condition.

11. A vehicle control method comprising:

a state judging step of judging, by a vehicle state judgment unit, a transverse driving control state and a longitudinal driving control state of a vehicle only when detecting that a torque of a vehicle power source is abnormal;

a normal power source judging step of judging, by the vehicle state judgment unit, a normal power source among a plurality of power sources of the vehicle only when the transverse driving control is a normal state and the longitudinal driving control is in a failure state;

a driving condition judging step of judging, by a driving condition judgment unit, whether a driving state of the vehicle corresponds to a predetermined accident risk driving condition by using vehicle information only when there is the normal power source; and a safety torque control step of controlling, by a vehicle control unit, vehicle driving by using a target safety torque provided in advance only when the driving state of the vehicle corresponds to the accident risk driving condition, wherein the vehicle is operated using the target safety torque only when the driving state is the accident risk driving condition.

12. The vehicle control method of claim 11, further comprising:

a detecting step of judging, by the vehicle state judgment unit, whether a torque is normal by using a user's required torque and a torque of the vehicle power source before the state judging step; and a state confirming step of receiving, by the vehicle state judgment unit, a current state signal from each of a controller related to longitudinal driving control of the vehicle and a controller related to transverse driving control of the vehicle when detecting that the torque of the vehicle is abnormal after the detecting step.

13. The vehicle control method of claim 11, wherein the state judging step includes:

a first state judging step of judging whether the controller related to the transverse driving control has a failure based on the current state signal, and a second state judging step of judging whether the controller related to the longitudinal driving control has the failure based on the current state signal.

14. The vehicle control method of claim 13, wherein the state judging step further includes:

dividing and setting an accident risk stage of the vehicle into three stages according to the transverse driving control state and the longitudinal driving control state.

15. The vehicle control method of claim 14, further comprising:

after the state judging step, a power source confirming step of judging, by the vehicle state judgment unit, whether there is the normal power source among the plurality of power sources based on a normal torque range including a lower threshold for torque error and an upper threshold for torque error provided in advance when the transverse driving control is in a normal state and the longitudinal driving control is in a failure state according to the accident risk stage of vehicle.

16. The vehicle control method of claim 11, further comprising:

a calculating step of calculating, by the vehicle state judgment unit, a power train allowance output of the vehicle by using the normal power source when there is the normal power source, after the normal power source judging step.

17. The vehicle control method of claim 11, further comprising:

after the normal power source judging step, judging, by the vehicle state judgment unit, that vehicle control is required through a predetermined minimum torque when there is no normal power source.

18. The vehicle control method of claim 10, further comprising:

an accident risk judging step of judging, by the driving condition judgment unit, when the vehicle is positioned on the slope, another vehicle approaches from the rear, or the driving vehicle is positioned in a low speed limit zone, that the accident risk driving condition is satisfied, after the driving condition judging step.

19. The vehicle control method of claim 11, further comprising:

a safety margin torque control step of controlling, by the vehicle control unit, vehicle driving with a predetermined minimum torque when transverse driving control is impossible, there is no normal power source, or the driving state of the vehicle does not correspond to the accident risk driving condition.

20. The vehicle control method of claim 11, wherein the safety torque control step includes a step of:

calculating, by the vehicle control unit, the target safety torque through two or more equations provided for each driving situation of the vehicle, and controls the vehicle driving by using the target safety torque when the driving state of the vehicle corresponds to the accident risk driving condition.

* * * * *